US011494206B2

(12) United States Patent
Zhang et al.

(10) Patent No.: US 11,494,206 B2
(45) Date of Patent: Nov. 8, 2022

(54) AUTOMATED INITIATION AND ADAPTATION OF A DIALOG WITH A USER VIA USER INTERFACE DEVICES OF A COMPUTING DEVICE OF THE USER

(71) Applicant: Google Inc., Mountain View, CA (US)

(72) Inventors: Guangqiang Zhang, Sunnyvale, CA (US); Zhou Bailiang, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 524 days.

(21) Appl. No.: 15/157,055

(22) Filed: May 17, 2016

(65) Prior Publication Data

US 2017/0337186 A1    Nov. 23, 2017

(51) Int. Cl.
*G06F 9/451* (2018.01)
*G06F 40/42* (2020.01)
(Continued)

(52) U.S. Cl.
CPC ............ *G06F 9/453* (2018.02); *G06F 3/0482* (2013.01); *G06F 3/04842* (2013.01);
(Continued)

(58) Field of Classification Search
CPC ............... G06F 17/2809; G06F 3/0482; G06F 3/04842; G06F 3/04883; G06F 3/167;
(Continued)

(56) References Cited

U.S. PATENT DOCUMENTS 9,785,715 B1 * 10/2017 Busey .................... G06Q 50/01
2002/0183072 A1 * 12/2002 Steinbach ........... G06F 16/9537
455/456.1
(Continued)

FOREIGN PATENT DOCUMENTS

JP    2002258738    9/2002
JP    2005106661    4/2005
(Continued)

OTHER PUBLICATIONS

International Search Report and Written Opinion of PCT Ser. No. PCT/US16/68734 dated Mar. 9, 2017.
(Continued)

*Primary Examiner* — Nicholas Ulrich
(74) *Attorney, Agent, or Firm* — Middleton Reutlinger

(57) ABSTRACT

Methods and apparatus directed to utilizing an automated messaging system to initiate and/or adapt a dialog with at least one user, where the dialog occurs via user interface input and output devices of at least one computing device of the user. In some of those implementations, the automated messaging system identifies at least one task associated with the user and initiates the dialog with the user based on identifying the task. The automated messaging system may initiate the dialog to provide the user with additional information related to the task and/or to determine, based on user input provided during the dialog, values for one or more parameters of the task. In some implementations, the automated messaging system may further initiate performance of the task utilizing parameters determined during the dialog.

17 Claims, 8 Drawing Sheets

(51) Int. Cl.
| | |
|---|---|
| *H04M 1/72457* | (2021.01) |
| *H04L 67/52* | (2022.01) |
| *G06F 16/332* | (2019.01) |
| *H04M 1/7243* | (2021.01) |
| *G06F 3/16* | (2006.01) |
| *G06F 3/0482* | (2013.01) |
| *G06F 3/04842* | (2022.01) |
| *G06F 3/04883* | (2022.01) |

(52) U.S. Cl.
CPC ......... *G06F 3/04883* (2013.01); *G06F 3/167* (2013.01); *G06F 16/3329* (2019.01); *G06F 40/42* (2020.01); *H04L 67/52* (2022.05); *H04M 1/7243* (2021.01); *H04M 1/72457* (2021.01)

(58) Field of Classification Search
CPC .... G06F 9/5011; G06F 40/42; G06F 16/9537; G06F 9/453; G06F 16/243; G06F 16/3329; H04M 1/72547; H04M 1/72572; H04M 1/7243; H04M 1/72457; H04W 4/02; H04W 4/021; H04W 4/029; H04L 67/18; H04L 67/52; G06Q 30/0261
See application file for complete search history.

(56) References Cited

U.S. PATENT DOCUMENTS

| | | | | |
|---|---|---|---|---|
| 2005/0281395 | A1* | 12/2005 | Wescott | G09B 7/06 379/88.13 |
| 2006/0150119 | A1* | 7/2006 | Chesnais | G06F 17/30401 715/810 |
| 2008/0140389 | A1 | 6/2008 | Funakoshi et al. | |
| 2008/0195312 | A1* | 8/2008 | Aaron | G06Q 10/109 455/418 |
| 2012/0245944 | A1* | 9/2012 | Gruber | G06F 17/3087 704/270.1 |
| 2012/0253790 | A1 | 10/2012 | Heck et al. | |
| 2014/0164509 | A1* | 6/2014 | Lynch | H04L 65/403 709/204 |
| 2014/0244661 | A1* | 8/2014 | Peiris | G06F 16/243 707/748 |
| 2014/0272821 | A1* | 9/2014 | Pitschel | G09B 19/06 434/157 |
| 2014/0365226 | A1 | 12/2014 | Sinha | |
| 2015/0113435 | A1* | 4/2015 | Phillips | H04L 51/02 715/752 |
| 2015/0142704 | A1* | 5/2015 | London | G06N 5/04 706/11 |
| 2015/0178652 | A1* | 6/2015 | Schulz | H04W 8/005 705/7.25 |
| 2017/0132019 | A1* | 5/2017 | Karashchuk | H04W 4/12 |
| 2017/0230316 | A1* | 8/2017 | Sharma | G06F 17/2785 |
| 2017/0235465 | A1* | 8/2017 | Marin | G06F 3/04883 715/716 |

FOREIGN PATENT DOCUMENTS

| | | | |
|---|---|---|---|
| JP | 2008146150 | 6/2008 | |
| KR | 20080094068 | 10/2008 | |
| KR | 20160010523 | 1/2016 | |
| WO | WO-2011161664 A1 * | 12/2011 | ............. G06Q 30/01 |

OTHER PUBLICATIONS

European Patent Office; Written Opinion of the International Preliminary Examining Authority of International Application No. PCT/US2016/068734; 5 pages; dated Mar. 26, 2018.

European Patent Office; International Preliminary Report on Patentability of International Application No. PCT/US2016/068734; 19 pages; dated Jul. 26, 2018.

Japanese Patent Office, Office Action, Application No. JP2018-560467, 14 pages, dated Dec. 2, 2019.

The Korean Intellectual Property Office; Office Action issued in Application No. 10-2018-7036107 dated Feb. 12, 2020. 16 Pages.

Japanese Patent Office, Decision of Rejection issue in Application No. JP2018-560467, 6 pages, dated May 11, 2020.

Japanese Patent Office, Notice of Allowance issue in Application No. JP2018560467, 3 pages, dated Oct. 26, 2020.

The Korean Intellectual Property Office; Decision of Rejection issued in Application No. 10-2018-7036107; 8 pages; dated Oct. 27, 2020.

The Korean Intellectual Property Office; Notice of Allowance issued in Application No. 10-2018-7036107; 11 pages; dated Dec. 10, 2020.

Intellectual Property India: Office Action issued for Application No. 201847003942 dated Aug. 25, 2020.

* cited by examiner

AUTOMATED INITIATION AND ADAPTATION OF A DIALOG WITH A USER VIA USER INTERFACE DEVICES OF A COMPUTING DEVICE OF THE USER

BACKGROUND

Some Internet platforms may enable a user to perform one or more actions associated with a specific service entity. However, the platforms typically require the user to explicitly identify the specific service entity prior to selecting criteria for the one or more actions and/or to make selections of structured options in selecting the criteria for the one or more actions. For example, a user may book a reservation at a particular restaurant by navigating to a web page for that particular restaurant and selecting a time, date, and number of people from drop down user interface menus of the web page. Also, for example, a user may schedule an appointment with a business by navigating to a web page for that business and selecting a time, date, and type of appointment from available options presented in user interface elements of the webpage.

However, these and/or other techniques may suffer from one or more drawbacks. For example, they may require that the user first identify the specific service entity and then provide structured input directed to performance of an action for that specific service entity. This may be a difficult task for certain users who may not be aware that the task is performable and/or which service entities may be utilized to perform the task. Also, for example, they may not enable specification of one or more (e.g., all) criteria of the action to be performed via free-form natural language input by the user. Also, for example, they may utilize fixed structured fields that are not adapted to intent of the user, such as intent determined based on user input in attempting to perform the action and/or intent determined based on past user actions and/or other source(s). Additional and/or alternative drawbacks may be presented.

SUMMARY

Implementations of this specification are directed to utilizing an automated messaging system to initiate and/or adapt a dialog with at least one user, where the dialog occurs via user interface input and output devices of at least one computing device of the user. In some of those implementations, the automated messaging system identifies at least one task associated with the user and initiates the dialog with the user based on identifying the task. The automated messaging system may initiate the dialog to provide the user with additional information related to the task and/or to determine, based on user input provided during the dialog, values for one or more parameters of the task. In some implementations, the automated messaging system may further initiate performance of the task utilizing parameters determined during the dialog. Initiation of the dialog by the automated messaging system may be beneficial to certain users who may not be aware that the task is performable and/or which service entities may be utilized to perform the task. For example, travelers to a new location, immigrants to a new location, etc. may be wholly unaware that certain tasks related to the new location are even performable and/or may be unaware that an automated messaging system may be utilized to initiate performance of certain tasks.

In some implementations, the automated messaging system may generate questions or other prompts during a dialog that solicit particular information from the user and may actively adapt the prompts based on user interface input provided by the user during the dialog. In some of those implementations, prompts generated by the automated messaging system during a dialog with the user may be configured to extract, from the user, values for necessary and/or desired parameters for a task, and may be adapted during the dialog based on the user's responses during the dialog. At least some of the prompts generated by the automated messaging system may be natural language prompts and at least some of the user interface input provided by the user during the dialog may be natural language free-form input. As used herein, free-form input is input that is formulated by a user and that is not constrained to a group of options presented for selection by the user.

In some implementations, in engaging in the dialog with the user, the automated messaging system may generate one or more prompts based on one or more protocols configured for one or more service entities. For example, the protocols may include "general" protocols that apply to a plurality of service entities that are members of the same class, and/or "specific" protocols that apply to a more narrowly tailored group than the general protocols (e.g., tailored to a subset of the class, such as a specific service entity of the class).

In some implementations, in engaging in the dialog with the user, the automated messaging system may generate content for presenting to the user based on one or more entries of a local language database. In some implementations, the local language database may include, for each of one or more geographic regions and/or languages, entries that define: language segments (e.g., sentences, phrases, and/or terms) that are utilized conversationally in that geographic region and/or language; and optionally indications of tasks that are associated with those language segments.

In various implementations, in generating content to present to a user, the automated messaging system may identify a language of the user (e.g., based on a stored attribute of the user, a language utilized in a messaging client executing on a computing device of the user). The system may determine content that is related to a task and that is in a source language, translate that content to the language of the user, and provide the translated content for presentation to the user. Also, in various implementations, user input received from the user in a dialog with the user may be free-form natural language input in a language of the user. In some of those implementations, the automated messaging system may translate the input from the language of the user to a preferred language of the system and/or a preferred language of a service entity associated with a task.

In some implementations, a method performed by one or more processors associated with an automated messaging system is provided that includes identifying at least one task for a user that indicates at least one action and at least one entity associated with the action. The method further includes initiating a dialog with the user, where the dialog is related to the task. The initiating is based on identifying the task, is via the automated messaging system, and includes providing, for presentation to the user via a user interface output device of a computing device of the user, content that is tailored to the task. The method further includes: receiving, in response to the providing, free-form natural language input that continues the dialog and that is formulated by the user via a user interface input device of the computing device; generating additional content that is tailored to the task and that is based on the natural language input; and providing, in continuance of the dialog, the additional content for presentation to the user via the user interface output device.

These and other implementations of technology disclosed herein may optionally include one or more of the following features.

In some implementations, the method further includes determining that the user is present at a location, identifying the task based on the task being associated with the location, and assigning the task to the user based on determining that the user is present at the location and that the task is associated with the location.

In some implementations, the method further includes determining that the user is present at a location and that the location is not a familiar location to the user, identifying the task based on the task being associated with individuals that are unfamiliar with the location, and assigning the task to the user based on determining that the location is not familiar to the user and that the task is associated with individuals that are unfamiliar with the location.

In some implementations, the method further includes identifying source language content that is tailored to the task and that is in a source language, identifying a language of the user that is different from the source language, and generating the content by translating the source language content from the source language to the language of the user.

In some implementations, the method further includes identifying a protocol that defines a plurality of parameters related to performance of the task and generating the content or the additional content to solicit input related to a group of one or more of the parameters.

In some implementations, the entity indicated by the action is a service entity and the first natural language input and the second natural language input are both in a native language of the user. In some of those implementations, the method further includes: identifying a preferred language for the service entity, translating at least some of the first natural language input and the second natural language input from the native language to the preferred language; and providing the translated natural language input to the service entity.

In some implementations, the method further includes assigning the at least one task to the user based on a current location of the user corresponding to a location of the entity. In some of those implementations, the content that is tailored to the task includes a common phrase spoken at the entity in association with the task, the natural language input is audio of an attempt to verbally speak the common phrase, and the second content is feedback based on analysis of the audio.

In some implementations, the method further includes identifying a protocol that defines a plurality of parameters related to performance of the action for the entity and generating the additional content to solicit a group of one or more of the parameters. In some of those implementations, the method further includes: receiving, in response to providing the additional content, additional free-form natural language input that continues the dialog and that is formulated by the user via the user interface input device; and determining one or more values for one or more of the parameters based on the additional free-form natural language input. In some versions of those implementations, the method further includes initiating the action for the entity with the determined one or more values.

In some implementations, the method further includes assigning the task to the user independent of any user interface input provided by the user to the automated messaging system. In some of those implementations, initiating the dialog is in response to user interface input directed to the automated messaging system, where that user interface input does not explicitly identify the task.

In some implementations, providing the additional content for presentation to the user includes providing the additional content for simultaneous display with the content. The simultaneous display with the content may be via a graphical user interface rendered by the computing device. In some of those implementations, providing the additional content for presentation to the user includes providing the additional content for simultaneous display with the natural language input. The simultaneous display with the natural language input may be via the graphical user interface rendered by the computing device. In some of those implementations, the automated messaging system is implemented at least in part on one or more computing devices that are remote from the computing device of the user.

In addition, some implementations include one or more processors of one or more computing devices, where the one or more processors are operable to execute instructions stored in associated memory, and where the instructions are configured to cause performance of any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations of this specification are directed to utilizing an automated messaging system to initiate and/or adapt a dialog with at least one user, where the dialog occurs via user interface input and output devices of a computing device of the user. In some of those implementations, the automated messaging system identifies at least one task associated with the user (e.g., a task that indicates at least one action and at least one entity (e.g., a service entity) associated with the action) and initiates the dialog with the user based on identifying the task. The automated messaging system may initiate the dialog to provide the user with additional information related to the task and/or to determine, based on user input provided during the dialog, values for one or more parameters of the task. In some implementations, the automated messaging system may further initiate performance of the task utilizing values of parameters that are determined during the dialog.

In some implementations, the automated messaging system may generate questions or other prompts during a dialog that solicit particular information from the user and may actively adapt the prompts based on user interface input provided by the user during the dialog. In some of those implementations, prompts generated by the automated messaging system during a dialog with the user may be configured to extract, from the user, values for necessary and/or desired parameters for a task, and may be adapted during the dialog based on the user's responses during the dialog.

In some implementations, in engaging in the dialog with the user, the automated messaging system may generate one or more prompts based on one or more protocols configured for one or more service entities and/or based on one or more entries of a local language database.

In various implementations, in generating content to present to a user, the automated messaging system may identify content that is related to a task and that is in a source language, translate that content to a different language that is a language of the user, and provide the translated content for presentation to the user. Also, in various implementations, user input received from the user in a dialog with the user may be in a language of the user, and the automated messaging system may translate the input to a preferred language of a service entity associated with a task.

Figure 1:
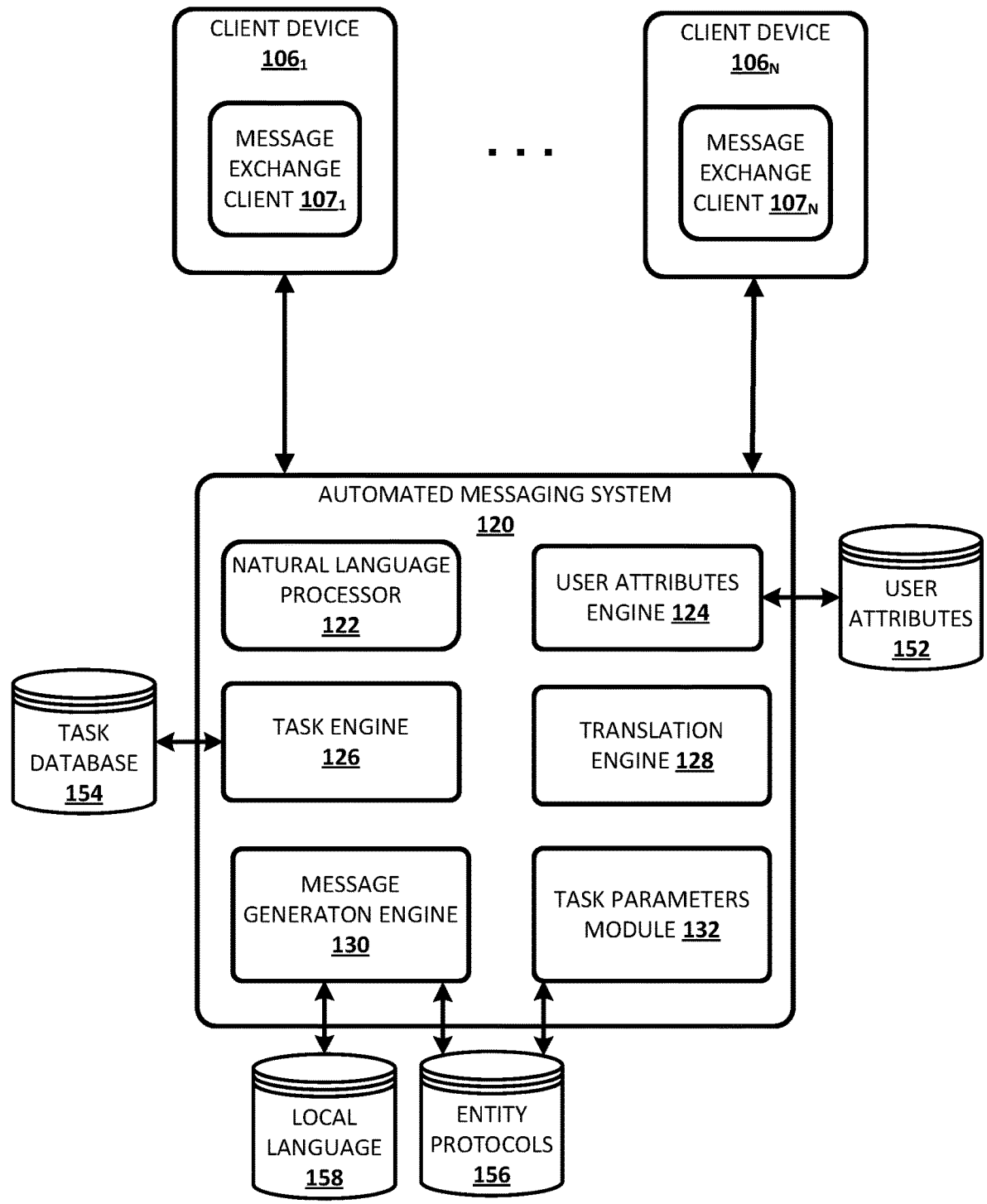
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$ and an automated messaging system 120. Although automated messaging system 120 is illustrated in FIG. 1 as separate from the client computing devices $106_{1-N}$, in some implementations all or aspects of the automated messaging system 120 may be implemented by one or more of the client computing devices $106_{1-N}$. For example, client device $106_1$ may implement one instance or more aspects of automated messaging system 120 and client device $106_N$ may also implement a separate instance of those one or more aspects of automated messaging system 120. In implementations where one or more aspects of automated messaging system 120 are implemented by one or more computing devices remote from client computing devices $106_{1-N}$, the client computing devices $106_{1-N}$ and those aspects of automated messaging system 120 may communicate via one or more networks such as a local area network (LAN) and/or wide area network (WAN) (e.g., the Internet).

The client computing devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with automated messaging system 120 utilizing a plurality of client computing devices that collectively form a coordinated "ecosystem" of computing devices. However, for the sake of brevity, examples described in this disclosure will focus on the user operating a single client computing device 106.

Each of the client computing devices $106_{1-N}$ may operate a variety of different applications, such as a corresponding one of the message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated messaging system 120, and so forth. In some implementations, one or more of the message exchange clients $107_{1-N}$ may be implemented via a webpage or other resources rendered by a web browser (not depicted) or other application of a client computing device.

As described in more detail herein, in various implementations the automated messaging system 120 identifies a task associated with a user of one of the client computing devices $106_{1-N}$ and initiates a dialog with the user that is related to the task by providing, for presentation to the user via the client computing device, content that is tailored to the task. "Initiation" of a dialog related to a task by the automated messaging system 120 does not necessarily mean that the user was unengaged in any dialog with the system 120 and/or that the user did not provide any input that caused the system 120 to initiate the dialog. Rather, it means that prior to the initiation of the dialog related to the task by the system, any ongoing dialog with the automated messaging system 120 was not explicitly directed to the task. For example, the user may be engaged in a dialog with the automated messaging system to get updates on the day's news, weather, etc.—and the system 120 may initiate a dialog related to a task during such engagement. In some implementations, the automated messaging system 120 may initiate a dialog with a user that is related to a task without the user having ever provided any input (e.g. natural language input in prior dialogs with the system 120) related to the task directly to the automated messaging system 120. For example, the automated messaging system 120 may initiate the dialog based on a current and/or past location of the user, based on user interactions with other systems (e.g., an email system, a search engine, a calendar system, and/or other system separate from the automated messaging system 120).

Each of the client computing devices $106_{1-N}$ and automated messaging system 120 may include one or more memories for storage of data and software applications, one or more processors for accessing data and executing applications, and other components that facilitate communication over a network. The operations performed by one or more of the client computing devices $106_{1-N}$ and/or by the automated messaging system 120 may be distributed across multiple computer systems. Automated messaging system 120 may be implemented as, for example, computer programs running on one or more computers in one or more locations that are coupled to each other through a network.

Automated messaging system 120 may include a natural language processor 122, a user attributes engine 124, a task engine 126, a translation engine 128, a message generation engine 130, and a task parameters module 132. In some implementations, one or more of engines 122, 124, 126, 128, 130, and/or module 132 may be omitted. In some implementations, all or aspects of one or more of engines 122, 124, 126, 128, 130, and/or module 132 may be combined. In some implementations, one or more of engines 122, 124, 126, 128, 130, and/or module 132 may be implemented in a component that is separate from automated messaging system 120. For example, one or more of 122, 124, 126, 128, 130, and/or 132, or any operative portion thereof, may be implemented in a component that is executed by of the client computing devices $106_{1-N}$.

Natural language processor 122 processes natural language input generated by users via client computing devices $106_{1-N}$ and generates annotated output for use by one or more other components of the automated messaging system 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver configured to group, or "cluster," references to the same entity based on one or more contextual cues. For example, the coreference resolver may be utilized to resolve the term "it" to "Asia Village" in the natural language input "I like Asia Village. Book it please."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations. For example, a first message of a user in a dialog with the automated assistant may be "do they have an appointment for tomorrow at noon" and a subsequent message of the user may be "book it for then". In processing "book it for then", the coreference resolver may resolve "it" to "appointment" and may resolve "then" to "tomorrow at noon" utilizing the prior input of "do they have an appointment for tomorrow at noon".

The user attributes engine 124 determines one or more attributes of a user who is engaged in a dialog with the automated messaging system 120 and/or with whom the automated messaging system 120 may initiate a dialog, and provides those attributes to one or more other components of automated messaging system 120. The attributes may be utilized by the other components of the automated messaging system 120, for example, in determining a task to assign to a user, in determining values for one or more parameters for the task, in determining when to initiate a dialog with the user, in generating output for a dialog with the one or more users, and/or in determining whether to translate natural language output provided to the user. The user attributes engine 124 is in communication with a user attributes database 152 that may store one or more user attributes. In various implementations, the user attributes engine 124 and/or user attributes database 152 may be implemented in whole or in part on client computing devices $106_{1-N}$ and/or may determine one or more user attributes based on data provided by client computing devices $106_{1-N}$. Some examples of user attributes that may be determined by user attributes engine 124 include a current location of the user (e.g., based on GPS or other location data), past location(s) of the user (e.g., a "home" of the user, locations previously visited by the user), language(s) of the user, a time constraint of the user (e.g., based on an electronic calendar of the user), and a user profile of the user (e.g., based on user activities across a plurality of Internet services).

The task engine 126 identifies a task for a user and provides message generation engine 130 with information related to that task (e.g., an identifier of an action and/or one or more service entities for the task, one or more predetermined values of parameters for the task) and optionally provides the message generation engine 130 with an indication of when it is appropriate for the engine 130 to initiate a task related dialog with the user. The task engine 126 may utilize one or more of various resources to determine a task for a user such as task database 154, user attributes provided by user attributes engine 124, and/or past natural language input provided by the user to the automated messaging system 120.

Task database 154 may be provided on one or more non-transitory computer readable media and may define a plurality of tasks that each indicate at least one action and at least one entity associated with the action. Some examples of tasks include scheduling an appointment with a government agency, requesting a service from a business, ordering a product from a business, ordering food in a restaurant, obtaining transportation via a taxi, meeting a client, setting up a utility service, buying a movie ticket, etc. Tasks may be defined in task database 154 with various levels of granularity. For example, a task may be defined as "schedule any appointment with any government agency" or more narrowly as "schedule an appointment with a particular government agency" or "schedule a particular type of appointment with a particular government agency". In some implementations, one or more tasks of task database 154 may each be associated with one or more particular users and/or one or more tasks of task database 154 may be associated with one or more particular criteria that may instantiate the task. In some implementations, all or aspects of task database 154 may be incorporated as part of one or more of the client computing devices $106_{1-N}$.

In some implementations, the task engine 126 may identify a task for a user based on that task being already associated with the user in task database 154. For example, task database 154 may include one or more entries that are specific to the user and that may be created in response to one or more computing-based actions that are by the user and/or that are directed to the user, such as one or more actions performed by the user via one or more of the client computing devices $106_{1-N}$ utilized by the user. For instance, task database 154 may include one or more calendar entries, reminder entries, and/or other entries that are personal to the user (e.g., not accessible to other users without the user's permission) and that may be deliberately created by the user via interaction by the user with one or more applications of a computing device (e.g., a calendar application).

Also, for instance, task database 154 may include one or more entries that are not deliberately created by the user, but that are inferentially created by one or more computing devices based on one or more actions performed by the user via one or more of the client computing devices $106_{1-N}$. For example, assume the user has performed multiple Internet searches related to removing old furniture, such as searches of "how do I get rid of old furniture", "who picks up furniture", and "furniture removal." In such an example, an entry for a furniture removal task may optionally be created for the user in task database 154 without the user deliberately creating the entry. As yet another instance, task database 154 may include one or more entries that are not deliberately created by the user, but that are created based on one or more computing-actions directed to the user, such as based on content of emails, text messages, or other communications sent to the user.

In some implementations, the task engine 126 may identify a task for a user without the task being already associated with the user in task database 154. For example, in some implementations task database 154 may include tasks that are associated with one or more criteria that may instantiate the task. Task engine 126 may determine one of those tasks as a task for the user based on conformance between those criteria and user attributes provided by user attributes engine 124. For example, task database 154 may include a task of "ordering food" that is associated with criteria of being in a restaurant, and being in a location with a primary language that is not a language spoken by a user and/or is not the user's primary language. Task engine 126 may identify the "ordering food" task for the user based on user attributes provided by user attributes engine 124 indicating that the current location of the user is in a restaurant and that the current location is in a geographic area with a language that is not spoken by the user. As another example, task database 154 may include a task of scheduling free junk removal with a particular city that is associated with criteria of being a new mover to that particular city. Task engine 126 may identify the "scheduling free junk removal" task based on user attributes provided by user attributes engine 124 indicating that the user has recently moved to that particular city. As yet another example, task database 154 may include a task of purchasing a subway ticket in a particular city that is associated with criteria of being a new visitor to that particular city. Task engine 126 may identify the "purchase a subway ticket" task based on user attributes provided by user attributes engine 124 indicating that the user is present in the particular city and has not previously visited the particular city.

Translation engine 128 may translate natural language input provided by a user to another language and/or may translate natural language output generated by message generation engine 130 to a language spoken by a recipient user of the output (e.g., a native language of the recipient user). In some implementations, the translation engine 128 may utilize one or more user attributes provided by user attributes engine 124 to determine a language that is spoken by a user, such as a native language of the user.

In some implementations, message generation engine 130 initiates a task related dialog with a user, via an associated client computing device of the user, and initiates the dialog based on identifying that the task is assigned to the user. For example, the message generation engine 130 may initiate dialog related to a task based on output provided by task engine 126 indicating that the task is a task of the user. As described with respect to translation engine 128, in various implementations the message generation engine 130 may engage in the dialog with the user via the translation engine 128. For example, the engine 128 may translate natural language output generated by the message generation engine 130 before it is presented to a user and/or may translate natural language input formulated by the user before it is provided to the message generation engine 130 and/or before it is provided to a service entity as part of a communication to initiate a task with the service entity.

The message generation engine 130 may initiate the task related dialog to provide the user with additional information related to the task and/or to determine, based on user input provided during the dialog, values for one or more parameters of the task. In some implementations, the message generation engine 130 may generate questions or other prompts during a dialog that are configured to extract, from the user, values for necessary and/or desired parameters for a task, and may be adapted during the dialog based on the user's responses during the dialog.

The message generation engine 130 utilizes one or more resources in generating questions or other prompts to solicit information from a user. For example, the message generation engine 130 may utilize current and/or past natural language input of the user during the dialog, annotations of that input provided by natural language processor 122, user attribute(s) provided by user attributes engine 124, values for task parameters or other task information provided by task engine 126, entity protocols of entity protocols database 156, and/or one or more entries of local language database 158. Message generation engine 130 may include a task parameters module 132 that determines what parameters for a task have been validly specified by natural language input provided by a user during a dialog, and stores values for those parameters in association with the task. The message generation engine 130 may utilize such stored values to prevent generation of natural language output that prompts the user to specify any parameters for a task that have already been validly specified for that task. The task parameters module 132 may further communicate the task and values of parameters for the task (values for parameters determined by task engine 126 and/or determined during dialog) to one or more other computing systems to initiate performance of the task.

Entity protocols database 156 may be provided on one or more non-transitory computer readable media and defines a plurality of protocols that are each applicable to one or more entities and/or one or more actions of a task. Each protocol defines one or more necessary and/or desired parameters to perform an associated action of a task and/or to perform the associated action with associated service entity/entities. For example, a first protocol may be a general protocol associated with a restaurant reservation action and associated with all restaurants that take reservations. The first protocol may define necessary parameters for the action such as a date of the reservation, a time of the reservation, and the number of people for the reservation. Also, for example, a second protocol may be a second protocol associated with a restaurant reservation action and associated with a subset of restaurants that take reservations, such as a specific restaurant. The second protocol may define necessary and/or desired parameters for the specific restaurant such as whether the user desires indoor or outdoor seating, a booth or a table, whether the user has dietary restrictions, etc.

Local language database 158 may be provided on one or more non-transitory computer readable media and includes, for each of one or more geographic regions and/or languages, entries that define: language segments (e.g., sentences, phrases, and/or terms) that are utilized conversationally in that geographic region and/or language; and optionally tasks that are associated with those language segments. For example, entries for a geographic region within the United States may include entries of: "I would like a ride to [location]", "what is the estimated fare to [location]", "thank you for the ride" that are all associated with one or more tasks such as a task of obtaining transportation from a taxi driver. Also, for example, entries for a geographic region within the United States may include entries of: "I would like to order [food]" that is associated with a visiting a restaurant task, an ordering food task, and/or other task; an entry of "Can you show me where the restrooms are?" that is associated with a visiting a restaurant task, a visiting a service entity task, and/or other task; etc. It is noted that the words in brackets "[ ]" in the preceding examples indicate a class of words that may be "filled in" by message generation engine 130 with a description of that class and/or with a particular word(s) that is a member of that class and that may be determined based on natural language input provided by a user. Language segments of local language database 158 may include textual segments and may also include audible files and/or links to audible files, such as ".wav" files, ".mp3" files, ".mpeg" files and/or files in other format that, when executed by a computing device, cause the computing device to generate corresponding audio output.

The message generation engine 130 may utilize entries of local language database 158 in determining content to provide to a user in initiating and/or continuing a dialog related to a task. For example, as described in more detail herein, for a given task of a user the message generation engine 130 may identify one or more language segments that are associated with that task in database 158, and that are associated with a current location of the user and/or associated with a language at the current location of the user. The message generation engine 130 may audibly and/or visually present those language segments to the user as part of content provided in initiating a dialog with the user related to a task and/or as part of additional content provided in continuance of the task related dialog with the user.

Figure 2A:
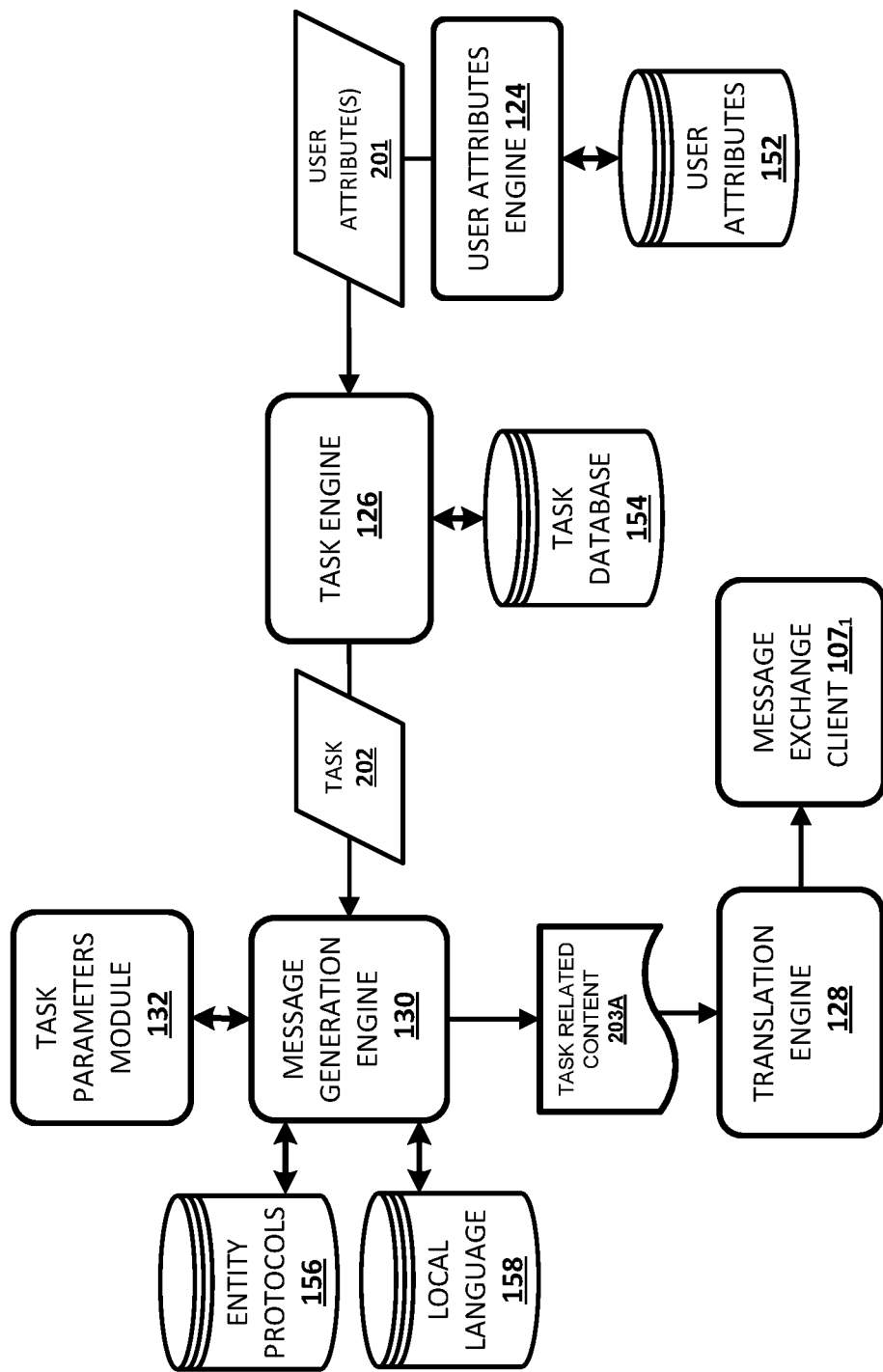
FIG. 2A illustrates an example of providing, based on a task of a user, task related content to a message exchange client of the user to initiate a dialog with the user via the message exchange client.
Figure 2B:
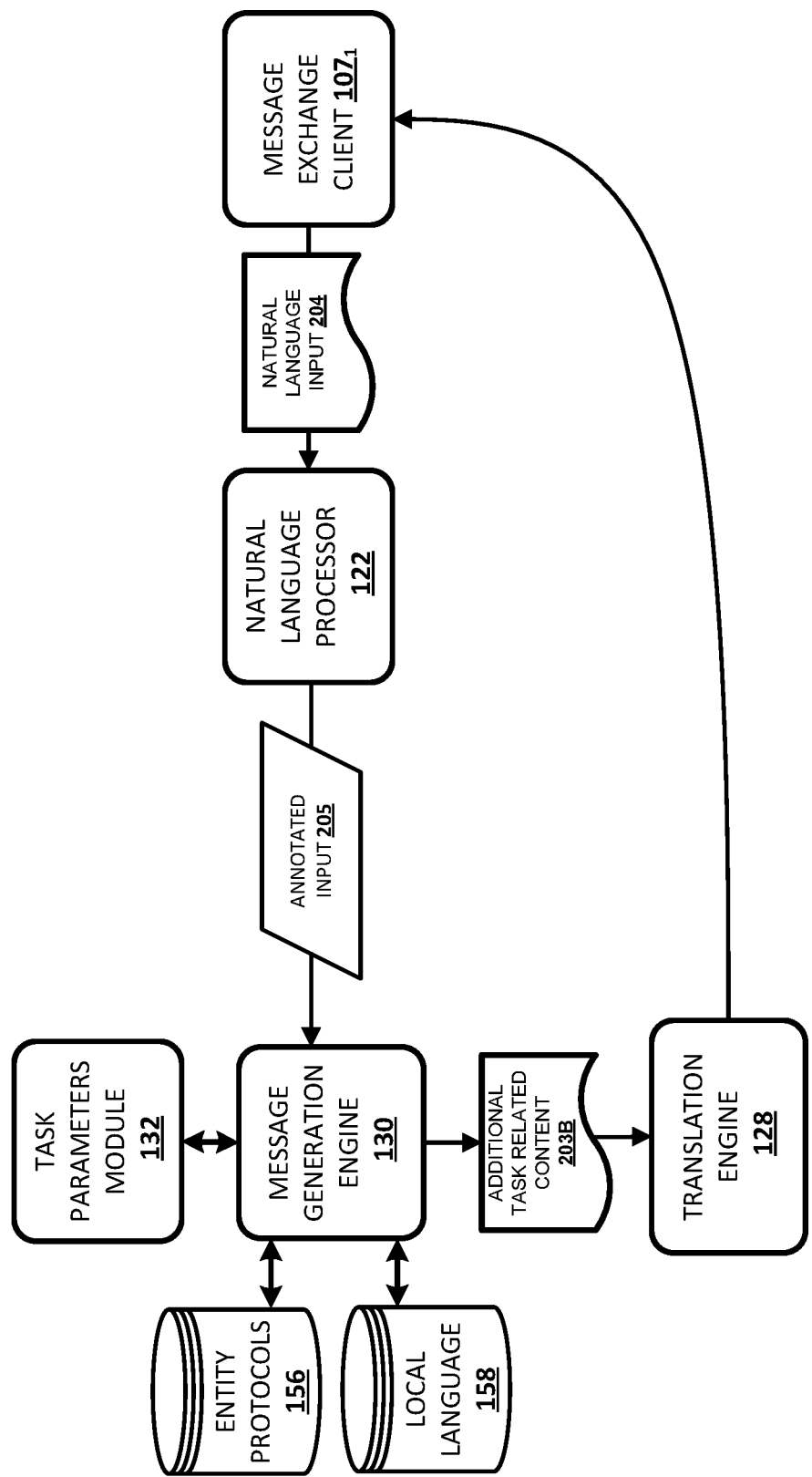
FIG. 2B illustrates an example of continuing the dialog initiated in FIG. 2A by generating additional task related content based on the task of the user and based on natural language input provided by the user in continuance of the dialog, and providing the additional task related content to the message exchange client.
Figure 3A:
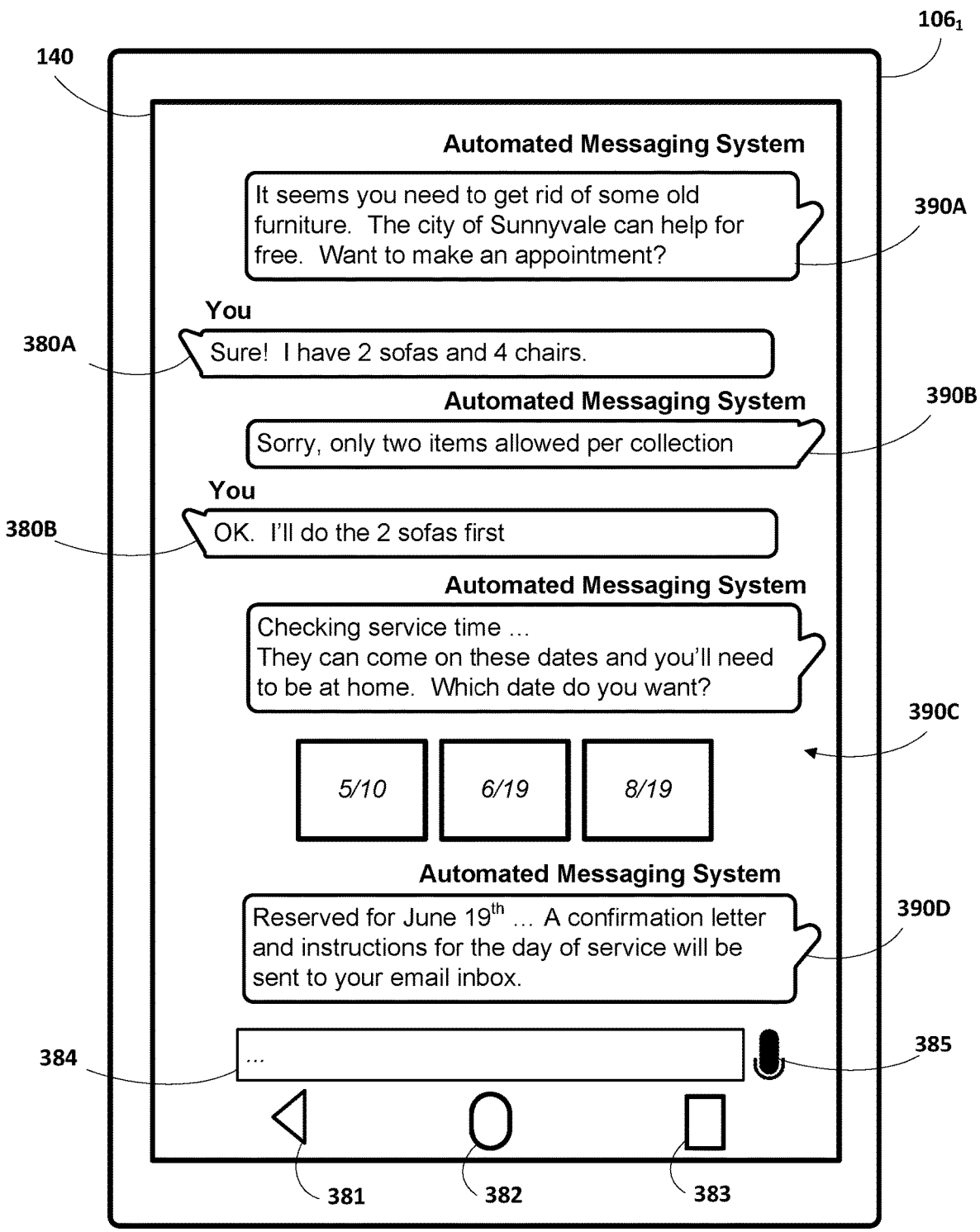
FIG. 3A illustrates an example client computing device with a display screen displaying an example of dialog that may occur between a user of the client computing device and an automated messaging system according to implementations described herein.

Turning now to FIGS. 2A and 2B, additional description is provided of various components of automated messaging system 120 and message exchange client $107_1$. Some description of FIGS. 2A and 2B is provided with examples from FIG. 3A. FIG. 3A illustrates the computing device $106_1$ of FIG. 1 with a display screen 140 displaying an example of dialog that may occur between a user of the client computing device $106_1$ and the automated messaging system 120 according to implementations described herein. In particular, the dialog includes task related content 390A, 390B, 390C, and 390D that may each be generated by the automated messaging system 120 according to implementations described herein and includes user inputs 380A and 380B. The display screen 140 further includes a textual reply interface element 384 that the user may select to generate user input via a virtual keyboard and a voice reply interface element 385 that the user may select to generate user input via a microphone. The display screen 140 also includes system interface elements 381, 382, 383 that may be interacted with by the user to cause the computing device $106_1$ to perform one or more actions.

FIG. 2A illustrates an example of providing, based on a task 202 of a user, task related content 203A to a message exchange client $107_1$ of the user to initiate a dialog with the user via the message exchange client $107_1$.

In FIG. 2A, task engine 126 identifies a task 202 of a user based on task database 154 and/or based on one or more user attributes 201 provided by user attributes engine 124. The task engine 126 provides the task 202 to message generation engine 130.

As a working example, assume task engine 126 determines a task 202 of "removing old furniture" that indicates the action of "removing furniture" and indicates a particular service entity of "the city of Sunnyvale" for the action. In some implementations of the working example, task engine 126 may identify the task based on it being associated with the user in task database 154 and/or based on user attributes 201 provided by user attributes engine 124.

For example, assume the user has submitted multiple searches to a separate search engine that are related to removing furniture, such as searches of "how do I get rid of furniture", "who picks up furniture", and "furniture removal." In such an example, a general furniture removal task may optionally be associated with the user in task database 154 based on those searches. In some implementations of the working example, task engine 126 may identify the city of Sunnyvale as a particular service entity for the furniture removal task based on user attributes 201 provided by user attributes engine 124. For example, the task engine 126 may determine, based on the user attributes 201, that the user is a resident of the city of Sunnyvale, and may further determine, based on task database 154 and/or other resource, that a furniture removal task for the city of Sunnyvale is associated with mandatory criteria of being a resident to that particular city. Also, for example, the task engine 126 may determine, based on the user attributes 201, that the user is a new mover to the city of Sunnyvale, and may further determine, based on task database 154 and/or other resource, that a furniture removal task for the city of Sunnyvale is associated with optional criteria of being a new mover to that particular city (e.g., since new movers may not yet be familiar with the city's services). Based on the conformance between the user attributes 201 and the criteria for the furniture removal task for the city of Sunnyvale, the task engine 126 may identify that task as a task for the user.

Message generation engine 130 utilizes the task 202 to identify an entity protocol from entity protocols database 156 and/or a language segment from local language database 158 for use in generating task related content 203A. In some implementations, the task related content 203A is natural language output, such as a natural language output that is a prompt to solicit user interface input from the user for use in determining whether the user wants help in performing the task (e.g., natural language output of "It seems you need to perform [task]. Would you like me to help?") and/or in determining necessary and/or desired parameters for the task 202 ((e.g., natural language output of "It seems you need to perform [task]. I can help. Let me know [task parameter(s)] if so").

The task related content 203A is provided to the message exchange client 107₁ for audible and/or visual presentation to the user via a user interface output device of the client computing device 106₁. In some implementations, the task related content 203A is natural language output and that output is translated by translation engine 128 to a language of the user of the message exchange client 107₁. In those implementations, the translated output is provided to the message exchange client 107₁. In some other implementations, the message exchange client 107₁ may incorporate the translation engine 128 and perform the translation.

In some implementations, the message generation engine 130 utilizes an action and/or an entity indicated by task 202 to determine an entity protocol for utilization in generating an automated message. For example, for a "making a restaurant reservation" task that indicates a restaurant reservation action for restaurant candidate entities, the engine 130 may identify a general entity protocol that is applicable to all restaurants for making reservations. The general entity protocol may be identified based on it being assigned to the "making a restaurant reservation" action and/or to "restaurant" entities in the entity protocols database 156. The general entity protocol may define one or more necessary and/or desired parameters to perform the task such as: a date of the reservation, a time of the reservation, the number of people for the reservation, and the restaurant for the reservation. The engine 130 may generate the task related content 203A to solicit information regarding one or more of those parameters. In some implementations, one or more of the parameters of the general entity protocol and/or other protocols may include or otherwise indicate text for inclusion in prompts for those parameters. For example, a parameter related to a number of people for the reservation may include text such as "for how many" or "how many people".

In some implementations, the message generation engine 130 includes the task parameters module 132 that determines what parameters, if any, are already specified by the task 202. For example, task 202 may be provided by task engine 126 with values for one or more parameters already specified such as the particular service entity for performance of the task 202. The message generation engine 130 may utilize the already specified parameter(s) to prevent generation of task related content 203A that prompts the user to specify the already specified parameters.

Continuing with the working example, message generation engine 130 may generate task related content 390A of FIG. 3A in response to a task 202 of "removing old furniture" that indicates the action of "removing furniture" and indicates a particular service entity of "the city of Sunnyvale" for the action. In some implementations, the message generation engine 130 may generate the content 390A based on a protocol of entity protocols database 156. For example, database 156 may include a specific entity protocol associated with the action of "removing furniture" and associated with the particular service entity of "the city of Sunnyvale." In some of those implementations, the protocol may include some or all of the natural language text of content 390A and an indication that the text should be provided to initiate a dialog with the user that is related to the task. Although the content 390A is shown in English in FIG. 3A, in some implementations it may be translated by translation engine 128 to another language and the translation provided to the user as the content 390A.

FIG. 2B illustrates an example of continuing the dialog initiated in FIG. 2A by generating additional task related content 203B based on the task 202 (FIG. 2A) (e.g., based on an entity protocol selected based on the task) and based on natural language input 204 provided by the user in continuance of the dialog. The additional task related content 203B is provided to the message exchange client 107₁ for visual and/or audible presentation to the user.

In FIG. 2B, in response to the task related content 203A of FIG. 2A, a user utilizes one or more user interface input devices of the computing device 106₁ to provide responsive natural language input 204 to message exchange client 107₁, which transmits the natural language input 204 to natural language processor 122. The natural language input 204 may be free-from input as described herein and may be, for example, typed input provided by the user via a physical or virtual keyboard of a computing device or spoken input provided by the user to a microphone of the computing device. In implementations where the natural language input 204 is spoken input, it may optionally be transcribed to textual input by the computing device and/or by the natural language processor 122.

Continuing with the working example, the natural language input 204 may be "Sure! I have 2 sofas and 4 chairs" as illustrated by user input 380A of FIG. 3A—and may be provided by the user in continuance of the dialog that was initiated by the message generation engine 130 by providing the task related content 390A.

The natural language processor 122 processes the natural language input 204 and generates various annotations of the natural language input. The natural language processor 122 provides annotated output (e.g., terms of the natural language input 204 and generated annotations) 205 to message generation engine 130.

Continuing with the working example, the natural language input 204 may be "Sure! I have 2 sofas and 4 chairs" as illustrated by user input 380A of FIG. 3A, and the natural language processor 122 may annotate "Sure!" as an affirmative response, annotate "sofas" an "chairs" as furniture entities and annotate "2" as a quantity associated with "sofas" and "4" as a separate quantity associated with "chairs". The natural language processor 122 may provide one or more of those terms and/or the annotations as the annotated input 205.

The message generation engine 130 utilizes the annotated input 205 and an entity protocol from entity protocols database 156 and/or a language segment from local language database 158 for use in generating additional task related content 203B. For example, the message generation engine 130 may analyze the annotated input 205 to determine whether the annotated input 205 indicates a desire of the user for further task related content. For instance, if the input 205 indicates a desire for further task related content, the message generation engine 130 may utilize the entity protocol utilized in FIG. 2A to generate additional task related content 203B that prompts the user to provide values for one or more desired and/or necessary parameters defined by the entity protocol. As described herein, the task parameters module 132 may also determine what parameters, if any, for an action are validly specified by the natural language input 204 (and/or were already specified by the task 202), and store the specified values for those parameters. The message generation engine 130 may utilize the determination of the module 132 to prevent generation of additional task related content 203B that prompts the user to specify those parameters again. For example, where the message generation engine 130 utilizes a protocol that defines parameters that include a parameter for "date of appointment", the module 132 may assign a particular date for that parameter if the natural language input 204 indicates that particular date and that particular date is valid for that parameter. Based on the assignment, that parameter may be ignored by the engine 130 and the additional task related content 203B generated based on other parameters instead.

Continuing with the working example, in response to received natural language input 204 of "Sure! I have 2 sofas and 4 chairs", the message generation engine 130 may generate additional task related content 203B of "Sorry, only two items allowed per collection". In some implementations, the engine 130 may generate the content 203B based on input provided by the task parameters module 132. For example, the module 132 may utilize the annotated input 205 to determine that six furniture items are specified in natural language input 204 for a parameter (of the protocol utilized in FIG. 2A) that has a maximum value of two furniture items—and provide an indication to message generation engine 130 that the specified values for the parameters are not valid. The message generation engine 130 may generate the content 390B based on the parameter for the protocol and based on the maximum value specified for that parameter in the protocol.

The additional task related content 203B is provided to the message exchange client 107$_1$ for audible and/or visual presentation to the user via a user interface output device of the client computing device 106$_1$. In some implementations, the additional task related content 203B is natural language output and that output is translated by translation engine 128 to a language of the user of the message exchange client 107$_1$. In those implementations, the translated output is provided to the message exchange client 107$_1$.

Continuing with the working example, assume that another instance of the example of FIG. 2B occurs after the message generation engine 130 has provided the additional task related content 390B. In particular, assume that the user provides the further additional user input 380B of FIG. 3A that indicates "OK. I'll do the 2 sofas first". In some of those implementations, the message generation engine 130 may generate further additional task related content 390C of FIG. 3A. For example, the task parameters module 132 may determine that user input 380B indicates a valid value (two) for the quantity of furniture items parameter of the protocol, and message generation engine 130 may generate the additional task related content 390C of FIG. 3A to solicit user input for an "appointment date" parameter of the protocol that does not yet have a valid value assigned.

Additional task related content 390C includes information related to the appointment date parameter (e.g., "you'll need to be at home") that may be determined (e.g., defined in) the protocol, includes a prompt ("Which date do you want"), and includes three selectable options of valid values (dates) for the appointment date parameter. In some implementations, the message generation engine 130 may determine the dates for the selectable options by referencing one or more databases that are updated to reflect available service dates for the city of Sunnyvale, by sending a communication to a computing system and/or person associated with the city of Sunnyvale and receiving the dates in reply, and/or utilizing other techniques.

A user may select one of the selectable options through interaction with its corresponding graphical element (e.g., by tapping the graphical element) and/or by further natural language input, such as "June 19$^{th}$ please". For example, as indicated in FIG. 3A, assume the user "taps" or otherwise selects the graphical element that includes "6/19". That further input may be provided to the message generation engine 130 which may determine, via task parameters module 132, that all parameters for the task have been specified with valid values. In response, the message generation engine 130 may provide further additional task related content 390D indicating that the task has been initiated ("Reserved for June 19$^{th}$") and providing further information related to the task ("A confirmation letter . . . inbox"). In some implementations, the task parameters module 132 may initiate the task by communicating specified values of parameters for the task to one or more other computing systems (e.g., controlled by the city of Sunnyvale) to initiate performance of the action by those computing systems and/or by one or more humans receiving user interface output from those computing systems.

Figure 3B:
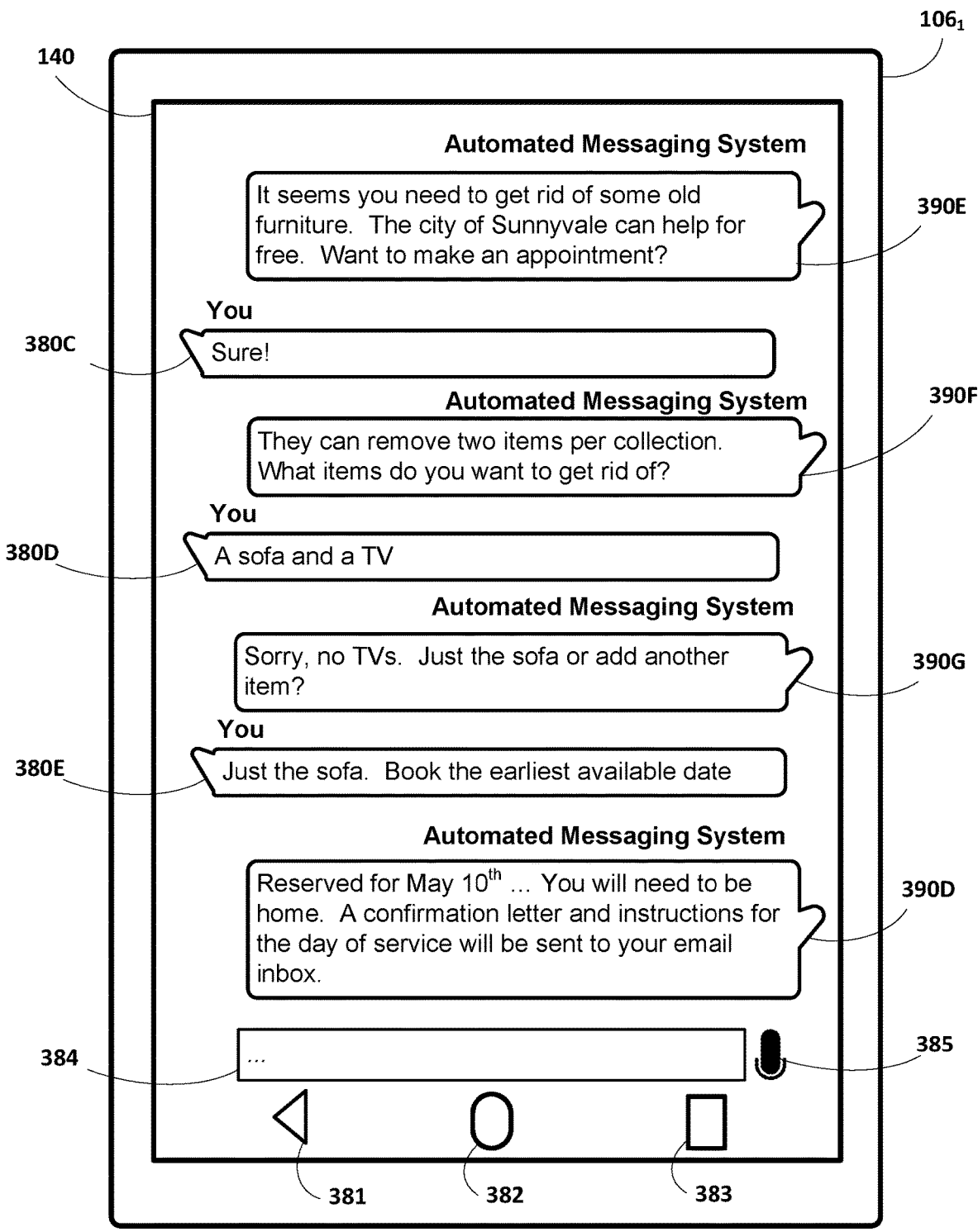
FIG. 3B illustrates the example client computing device of FIG. 3A, with a display screen displaying another example of dialog that may occur between a user of the client computing device and an automated messaging system according to implementations described herein.

FIG. 3B illustrates the computing device 106$_1$ of FIG. 1 with a display screen 140 displaying another example of dialog that may occur between a user of the client computing device 106k and the automated messaging system 120 according to implementations described herein. In particular, FIG. 3B illustrates one example of how the dialog of FIG. 3A may have differed in response to the user providing different natural language user interface input than that illustrated in FIG. 3A. In other words, it illustrates one example of how the automated messaging system 120 may adapt a dialog based on user interface input that is provided during the dialog.

In FIG. 3B, the automated messaging system 120 initiates the dialog with task related content 390E that is the same as the task related content 390A of FIG. 3A. In FIG. 3B, the user responds with input 380C that includes only "Sure!" and that does not specify a quantity of items as in input 380B of FIG. 3A. The automated messaging system 120 provides further task related content 390F that may be generated based on the quantity of furniture items parameter of the protocol as in FIG. 3A, but includes different content since the user did not specify an invalid quantity parameter in input 380C as the user did in input 380B of FIG. 3A.

In FIG. 3B, the user responds with input 380D of "A sofa and a TV." The message generation engine 130 responds with further task related content 390G of "Sorry, no TVs. Just the sofa or add another item?" This response may be based on a further parameter of the protocol that specifies televisions are not available for removal.

The dialog of FIG. 3B continues with further user input 380E and further task related content 390D that is tailored to the further user input 380E.

Figure 4:
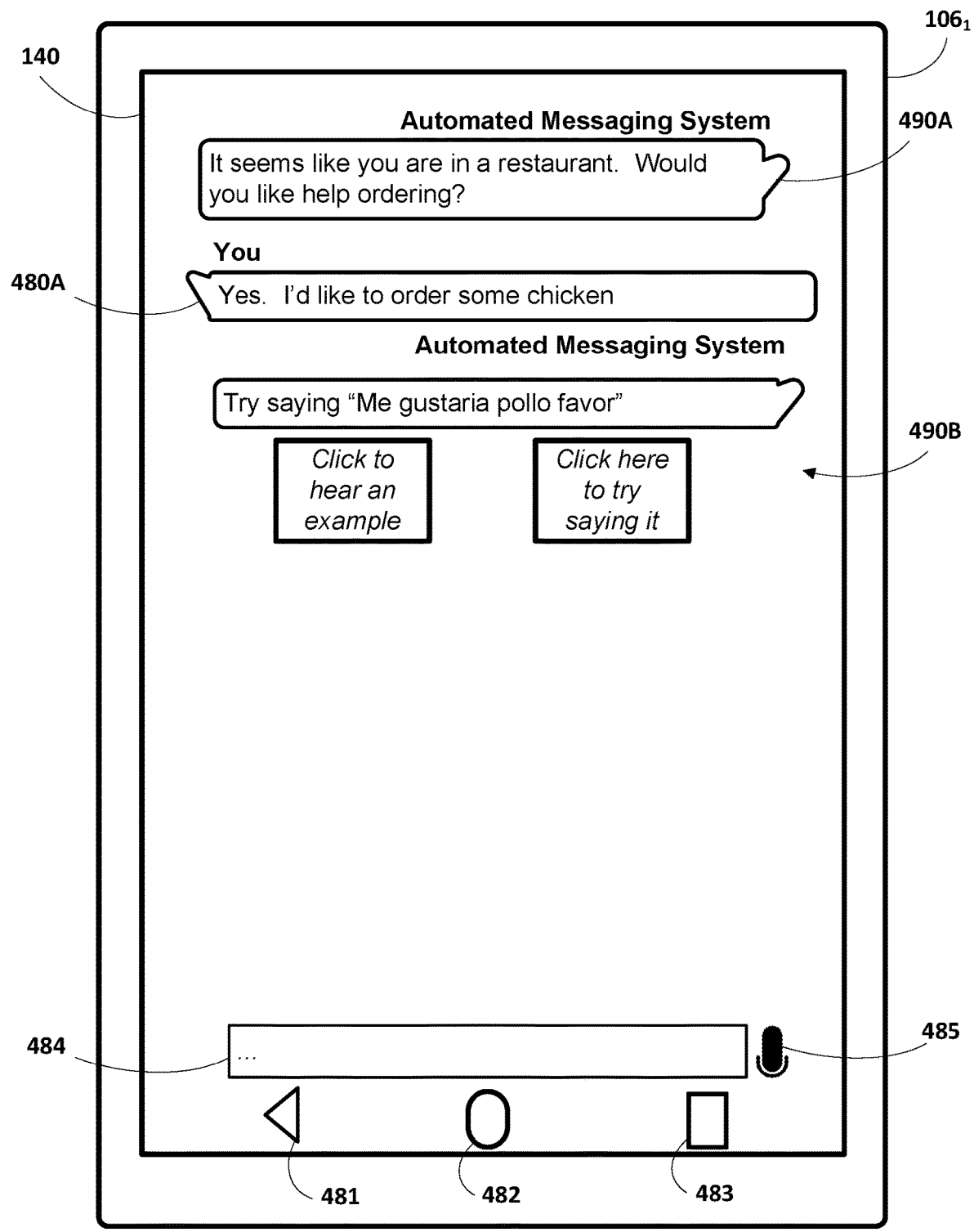
FIG. 4 illustrates the example client computing device of FIGS. 3A and 3B, with a display screen displaying yet another example of dialog that may occur between a user of the client computing device and an automated messaging system according to implementations described herein.

Turning now to FIG. 4, further examples of the message generation engine 130 utilizing the local language database 158 to generate task related content is provided. FIG. 4 illustrates the computing device $106_1$ of FIG. 1 with a display screen 140 displaying yet another example of dialog that may occur between a user of the client computing device 106i and the automated messaging system 120 according to implementations described herein. The display screen 140 in FIG. 4 further includes a textual reply interface element 484 that the user may select to generate user input via a virtual keyboard and a voice reply interface element 485 that the user may select to generate user input via a microphone. The display screen 140 also includes system interface elements 481, 482, 483 that may be interacted with by the user to cause the computing device $106_1$ to perform one or more actions.

In FIG. 4, task engine 126 has identified a task of "ordering food in a restaurant" that indicates the action of "ordering food" and indicates a service entity of "a restaurant" for the action. In some implementations, task engine 126 may identify the "ordering food in a restaurant" task based on determining that one or more user attributes of the user provided by user attributes engine 124 conform to one or more criteria for that task. For example, assume the "ordering food in a restaurant" task includes criteria of being in a restaurant and being in a geographic region with a primary language that differs from a language of the user (e.g., the user's primary language). Further assume that the user attributes of the user indicate that the user is in a restaurant and that the restaurant is in a geographic region whose primary language is different from any languages for the user. For instance, assume the user is in a Spanish speaking country and the only language spoken by the user is English. The task engine 126 may identify the "ordering food in a restaurant" task based on such conformance between the user attributes and the criteria for the task.

Message generation engine 130 utilizes the task of "ordering food in a restaurant" to generate the task related content 490A that prompts whether the user would like help performing the task ("Would you like help ordering?").

In response to the task related content 490A of FIG. 4, a user utilizes one or more user interface input devices of the computing device $106_1$ to provide responsive natural language input 480A of "Yes. I'd like to order some chicken".

The message generation engine 130 uses the task and the user's current location (as indicated by user attributes) to identify a natural language entry of "Me gustaria [food] favor" from local language database 158. For example, that natural language entry may be identified based on it being associated in the database 158 with a task of "ordering food" and being associated with a geographic region that corresponds to the user's current location. The message generation engine 130 generates content 490B that includes natural language output based on the natural language entry, and that includes "polio" substituted for the placeholder "[food]" based on "polio" being a translation of "chicken" that was indicated in input 480A.

The content 490B further includes a selectable graphical element ("Click here to hear an example") that, when selected by the user, will cause "Me gustaria polio favor" to be audibly presented to the user via a speaker of the computing device $106_1$. In some implementations, "Me gustaria polio favor" may be audibly presented to the user automatically in lieu of or in addition to the display of "Me gustaria polio favor".

The content 490C further includes a selectable graphical element ("Click here to try saying it") that, when selected by the user, will cause spoken input provided by the user to be captured by a microphone of the computing device $106_1$. The spoken input can be analyzed by the automated messaging system 120 and/or other component to determine if it matches "Me gustaria polio favor". If it matches, the automated messaging system 120 may provide feedback to the user, via further task related content (not illustrated), that indicates the user properly recited the language segment. If it doesn't match, the automated messaging may provide feedback to the user, via further task related content (not illustrated), that indicates the user did not properly recite the language segment, that indicates the term(s) that were not properly recited, and/or that audibly provides the phrase to the user and/or offers the user another opportunity to hear the phrase.

Although a particular example of utilizing an entry from local language database 158 is illustrated in FIG. 4, many variations are contemplated. For example, in some implementations in response to identifying a task of a user, the automated messaging system 120 may initiate the dialog by providing one or more contextually appropriate "foreign language" phrases without first prompting the user to confirm the user would like to be provided with those phrases. For instance, the initiation of the dialog of FIG. 4 may be "It seems like you are in a restaurant. If you would like to order food say 'Me gustaria, [the food you want], favor'. For example, to order chicken say 'Me gustaria polio favor'". The initiation of the dialog may further optionally automatically audibly present at least some content and/or automatically listen for a user's attempt to recite at least some of the content.

As another example, based on a user being in a restaurant in a geographic region with a primary language that differs from that of the user (or based on a calendar entry of the user indicating the user will soon be in such a restaurant), the task engine 126 may identify a more general task of "communicate in a restaurant". Further, the message generation engine 130 may identify, from local language database 158, multiple language segments that are related to that task such as language segments of "gracias" (thank you), "donde esta el bano" (where is the bathroom), "Me gustaria, [the food you want], favor" (I would like [the food you want] please). The message generation engine 130 may initiate the dialog with content of "Let me know if you would like to hear helpful local language phrases to use in a restaurant." In response to affirmative user input, the message generation engine 130 may present the user with one or more of the identified language segments (e.g., the N most popular language segments), along with an English explanation of those language segments.

A graphical user interface for engaging in a dialog is illustrated in FIGS. 3A, 3B, and 4, and described in some other examples herein. However, in some implementations the prompts provided by automated messaging system 120 may be conveyed to the user audibly (via speaker(s) of the computing device of the user) without necessarily displaying those prompts. Moreover, in some version of those implementations the user input may be provided via the user providing verbal user interface input. As one particular example, in some implementations a user may engage in a dialog with the automated messaging system utilizing a computing device that does not include any display.

Figure 5:
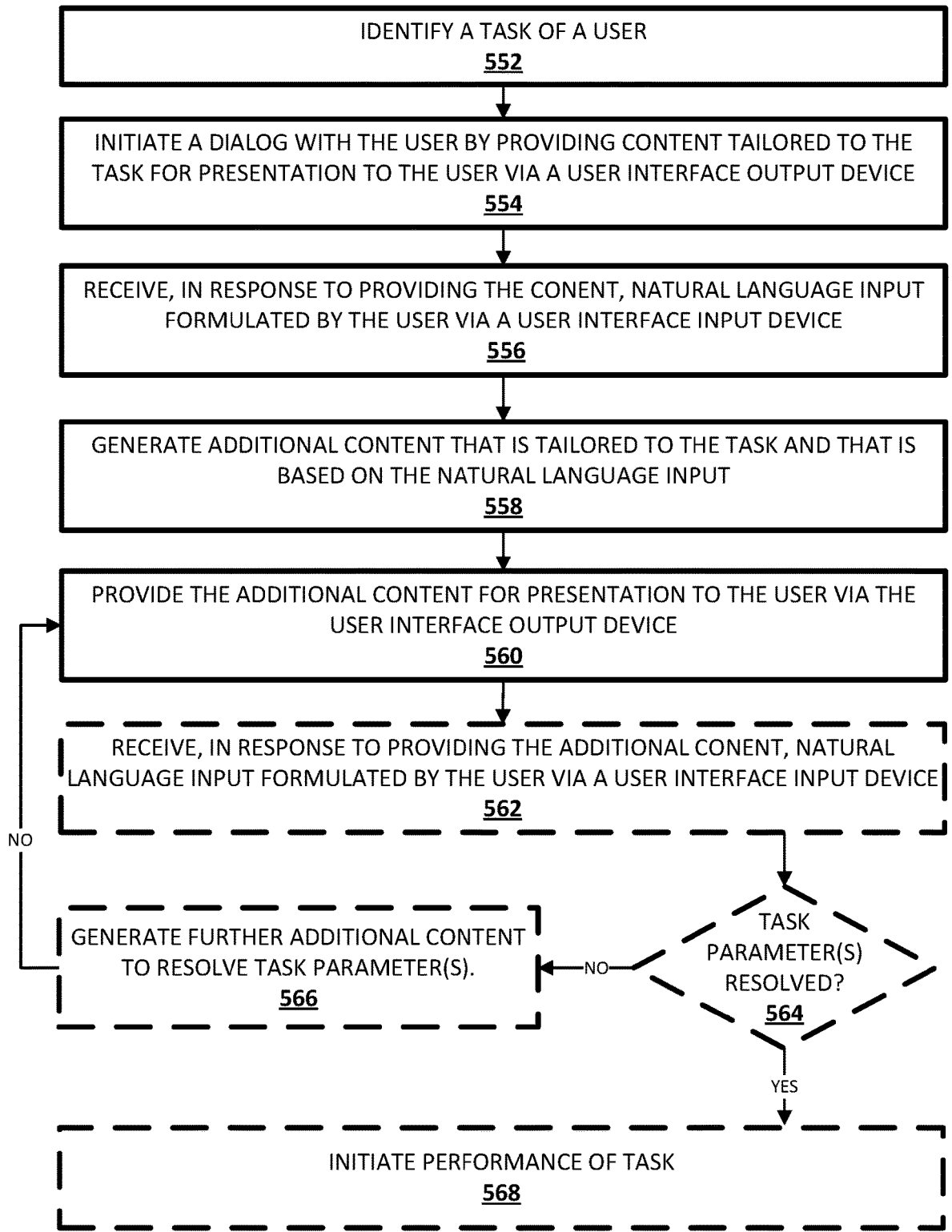
FIG. 5 is a flowchart illustrating an example method of initiating a dialog with a user based on a task of the user, adapting the dialog based on natural language input provided by the user during the dialog, and optionally initiating performance of the task with one or more parameters resolved during the dialog.

FIG. 5 is a flowchart illustrating an example method 500 of initiating a dialog with a user based on a task of the user, adapting the dialog based on natural language input provided by the user during the dialog, and optionally initiating performance of the task with one or more parameters resolved during the dialog. For convenience, the operations of the flow chart are described with reference to a system that performs the operations. This system may include various components of various computer systems, such as automated messaging system 120. Moreover, while operations of method 500 are shown in a particular order, this is not meant to be limiting. One or more operations may be reordered, omitted or added.

At block 552, the system identifies a task of a user.

At block 554, the system initiates a dialog with the user by providing content tailored to the task for presentation to the user via a user interface output device of a computing device of the user. In some implementations, the system may identify a protocol that is associated with a task (e.g., associated with an action and/or entity indicated by the task) and may generate the content based on the protocol. In some implementations, the system may identify one or more language segments that are associated with a task and may generate the content based on the language segment(s) and/or may generate the content to determine whether the user would like additional task content related to the language segments.

At block 556, the system receives, in response to providing the content at block 554, natural language input that is formulated by the user via a user interface input device of the computing device of the user (or of another computing device of the user). In some implementations the natural language input is free-form input formulated by a user via the user interface input device.

At block 558, the system generates additional content that is tailored to the task and that is based on the natural language input received in block 556. In some implementations, the system may generate the additional content based on a protocol associated with the task, such as the protocol optionally identified at block 554. For example, the system may generate the additional content to solicit user input related to task parameters defined in the protocol. In such an example, the system may generate the additional content based on the natural language input received in block 556 indicating that the user desires additional content related to the task and/or may generate the additional content based on a task parameter that did not have a valid value defined by the natural language input received in block 556. In some implementations, the content of block 554 includes a language segment associated with the task, the input of block 556 is an attempt by the user to verbally speak the language segment, and the additional content of block 558 is feedback directed to the attempt based on analysis of the input of block 556.

At block 560, the system provides the additional content for presentation to the user via the user interface output device of the computing device of the user.

At optional block 562, the system receives, in response to providing the additional content, further natural language input formulated by the user via a user interface input device.

At optional block 564, the system determines whether one or more task parameters (e.g., all task parameters or all necessary task parameters) for the task of block 552 are resolved by values provided with the task at block 552 and/or values determined based on the natural language input provided by the user at blocks 556 and/or 562. For example, the system may determine whether values have been defined for all necessary task parameters defined in a protocol for the task.

If the system determines all of the task parameters have not been resolved, the system proceeds to block 566 and generates further additional content to resolve the unresolved task parameter(s). In some implementations, the additional content is based on the protocol optionally determined at block 554 and/or 558. For example, the system may generate the additional prompt to solicit one or more particular parameters for the protocol determined at block 554, in view of those particular parameters not being specified by the input received at blocks 556 and 562.

After generating the additional prompt at block 566, the system then proceeds to blocks 560 and 562, then again determines at block 564 whether one or more task parameters (e.g., all task parameters or all necessary task parameters) for the task of block 552 are resolved based on yet further input that has been received at the second iteration of block 562.

If the system determines the task parameters can be resolved at block 564 (either at a first iteration of block 564 or a subsequent iteration), the system proceeds to optional block 568 where the system initiates performance of the task. In some implementations, the system may communicate the task, with values for one or more resolved parameters, to one or more other computing systems to initiate performance of the task by those computing systems and/or by one or more humans receiving user interface output from those computing systems.

Figure 6:
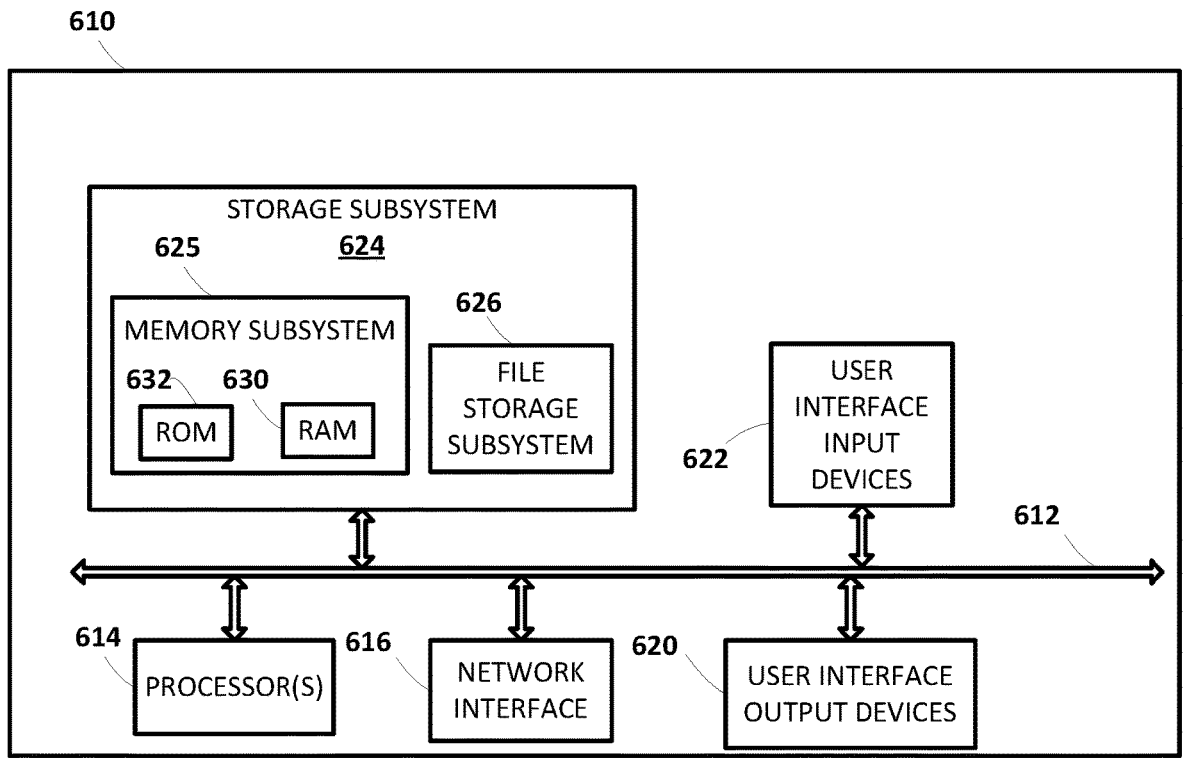
FIG. 6 illustrates an example architecture of a computing device.

FIG. 6 is a block diagram of an example computing device 610 that may optionally be utilized to perform one or more aspects of techniques described herein. In some implementations, one or more of the client computing devices 160$_{1-N}$, automated messaging system 120, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
for at least one task not already associated with a user:
determining, by one or more processors, that a current location of the user is not a familiar location to the user, wherein determining that the current location of the user is not a familiar location to the user is based on determining that the user is a new visitor to the current location who has not previously visited the current location;
identifying, by one or more of the processors associated with an automated messaging system and from a task database, a task for the user, the task indicating at least one action and at least one entity associated with the action, wherein the task identified from the task database based on:
identifying one or more actions performed by the user via one or more computing devices of the user, and
determining that the current location of the user is not a familiar location to the user;
assigning, by one or more of the processors, the task to the user, the assigning being independent of any user interface input provided by the user to the automated messaging system, wherein assigning the task to the user is based on determining that:
(i) the current location of the user is not familiar to the user,
(ii) the task is associated with individuals that are unfamiliar with a location of the entity that is indicated by the identified task, and
(iii) the location, of the entity, that is indicated by the task corresponds to the current location of the user;
identifying, by one or more of the processors, a protocol that defines a plurality of parameters related to performance of the action for the entity;
initiating, by one or more of the processors and based on assigning the task to the user and identifying the protocol, a dialog with the user that is related to the task, the initiating being by the automated messaging system and without the user having ever provided any input related to the task directly to the automated messaging system, the initiating comprising:
automatically providing, by the automated messaging system and for audible presentation to the user via a speaker of a computing device of the user, content that is tailored to the task,
wherein prior to initiating the dialog, by the automated messaging system, any ongoing dialog between the user and the automated messaging system was not explicitly directed to the task, and wherein the content that is tailored to the task is tailored to the entity of the task that is assigned to the user;

receiving, by one or more of the processors in response to the providing, free-form natural language input that continues the dialog and that is formulated by the user via a user interface input device of the computing device;

generating, by one or more of the processors, additional content that is tailored to the task and that is based on the natural language input and that solicits input directed toward a group of one or more of the plurality of parameters of the protocol;

providing, by one or more of the processors in continuance of the dialog, the additional content for presentation to the user via a user interface output device;

receiving, by one or more of the processors in response to providing the additional content, additional free-form natural language input that continues the dialog and that is formulated by the user via the user interface input device of the computing device;

determining, by one or more of the processors, that the free-form natural language input and the additional free-form natural language input include valid values for all parameters of the protocol for the task; and initiating, by one or more of the processors, performance of the action for the entity with the valid values.

2. The method of claim 1, further comprising:
determining, by one or more of the processors, that the current location of the user matches the location.

3. The method of claim 1, further comprising:
identifying, by one or more of the processors, source language content that is tailored to the task and that is in a source language;
identifying, by one or more of the processors, a language of the user that is different from the source language; and
generating the content by one or more of the processors by translating the source language content from the source language to the language of the user.

4. The method of claim 1, wherein the entity indicated by the action is a service entity, wherein the free-form natural language input and the additional free-form natural language input are both in a native language of the user, and further comprising:
identifying, by one or more of the processors, a preferred language for the service entity;
translating, by one or more of the processors, at least some of the free-form natural language input and the additional free-form natural language input from the native language to the preferred language; and
providing, by one or more of the processors, the translated natural language input to the service entity.

5. The method of claim 1, further comprising:
wherein assigning the task to the user is further based on the current location of the user being in a geographic area having a primary language that is not spoken by the user;
wherein the content that is tailored to the task is provided based on the current location of the user being in a geographic area having the primary language that is not spoken by the user includes a common phrase, in the primary language that is not spoken by the user, spoken at the entity in association with the task;
wherein the free-form natural language input, received in response to providing the content, is audio of an attempt to verbally speak the common phrase; and
wherein the additional content is feedback based on analysis of the audio.

6. The method of claim 1, further comprising:
identifying, by one or more of the processors, one or more of the parameters for which valid values are not specified;
generating, by one or more of the processors, further content to solicit input directed toward the one or more of the parameters for which valid values are not specified; and
providing, by one or more of the processors in continuance of the dialog, the further content for presentation to the user via the user interface output device.

7. The method of claim 1, further comprising:
determining that at least one value specified by natural language input is not valid for a given parameter of the parameters of the group;
wherein generating the additional content includes generating the additional content to include an indication that the value is not valid for the given parameter and include an indication of one or more criteria for the given parameter.

8. The method of claim 1, wherein initiating the dialog is in response to user interface input directed to the automated messaging system, wherein the user interface input does not explicitly identify the task.

9. The method of claim 1, wherein providing the additional content for presentation to the user comprises providing the additional content for simultaneous display with the content, the simultaneous display with the content being via a graphical user interface rendered by the computing device.

10. The method of claim 9, wherein providing the additional content for presentation to the user comprises providing the additional content for simultaneous display with the natural language input, the simultaneous display with the natural language input being via the graphical user interface rendered by the computing device.

11. The method of claim 9, wherein the automated messaging system is implemented at least in part on one or more computing devices that are remote from the computing device of the user.

12. The method of claim 1, wherein initiating the dialog with the user that is related to the task occurs during the ongoing dialog that was not explicitly directed to the task.

13. The method of claim 1 further comprising:
wherein assigning the at least one task for the user is further based on the current location of the user being in a geographic area having a primary language that is not spoken by the user;
wherein the content that is tailored to the task is provided based on the current location of the user being in a geographic area having a primary language that is not spoken by the user, and
wherein the additional content is an audible rendering of a common phrase, in the primary language that is not spoken by the user, spoken at the entity.

14. The method of claim 1 further comprising:
wherein assigning the at least one task for the user is further based on the current location of the user being in a geographic area having a primary language that is not spoken by the user, wherein the content or the additional content comprises a common phrase, in the primary language that is not spoken by the user, spoken at the entity.

15. A system comprising:
memory and one or more processors, the memory storing instructions that, when executed by the one or more processors, cause the one or more processors to:
for at least one task not already associated with a user, assign at least one task to the user, the task indicating at least one action and at least one entity associated with the action, wherein assigning the at least one task to the user causes the one or more processors to:
determine that the user is present at a current location and that the current location is not a familiar location to the user, wherein determining that the current location of the user is not a familiar location to the user is based on determining that the user is a new visitor to the current location who has not previously visited the current location;
identify, from a task database, a task for the user, the task indicating at least one action and at least one entity associated with the action, wherein the task is identified from the task database based on:
identifying one or more actions performed by the user via one or more computing devices of the user, and
determining that the current location of the user is not a familiar location to the user; and
assign the task to the user based on determining that:
(i) the current location of the user is not familiar to the user,
(ii) the task is associated with individuals that are unfamiliar with a location of the entity that is indicated by the identified task, and
(iii) the location, of the entity, that is indicated by the task corresponds to the current location of the user,
wherein the assigning is independent of any user interface input provided by the user to the system;
identify a protocol that defines a plurality of parameters related to performance of the action for the entity;
initiate, based on assigning the task to the user and identifying the protocol, a dialog with the user that is related to the task, wherein in initiating the dialog the one or more processors are to automatically provide, for audible presentation to the user via a speaker of a computing device of the user, content that is tailored to the task,
wherein initiating the dialog is performed without the user having ever provided any input related to the task directly to the computing device, and
wherein prior to initiating the dialog, any ongoing dialog was not explicitly directed to the task;
receive, in response to the providing, free-form natural language input that continues the dialog and that is formulated by the user via a user interface input device of the computing device;
generate additional content that is tailored to the task and that is based on the natural language input and that solicits input directed toward a group of the plurality of parameters of the protocol;
provide, in continuance of the dialog, the additional content for presentation to the user via a user interface output device;
receive, in response to providing the additional content, additional free-form natural language input that continues the dialog and that is formulated by the user via the user interface input device of the computing device;
determine that the free-form natural language input and the additional free-form natural language input include valid values for all parameters of the protocol for the task; and
initiate performance of the action for the entity with the valid values.

16. The system of claim 15, wherein the instructions to determine that the location is not a familiar location to the user further comprise instructions to determine that the current location of the user corresponds to a location of the entity and to determine the current location of the user is in a geographic area having a primary language that is not spoken by the user;
wherein the content that is tailored to the task is tailored to the entity of the task and is provided based on the current location of the user being in a geographic area having the primary language that is not spoken by the user includes a common phrase, in the primary language that is not spoken by the user, spoken at the entity in association with the task;
wherein the free-form natural language input, received in response to providing the content, is audio of an attempt to verbally speak the common phrase; and
wherein the additional content is feedback based on analysis of the audio.

17. At least one non-transitory computer-readable medium comprising instructions that, in response to execution of the instructions by one or more processors, cause the one or more processors to perform the following operations:
for at least one task not already associated with a user:
determine that a current location of the user is not a familiar location to the user, wherein determining that the current location of the user is not a familiar location to the user is based on determining that the user is a new visitor to the current location who as not previously visited the current location;
identify, from a task database, a task for the user, the task indicating at least one action and at least one entity associated with the action, wherein the task identified from the task database based on:
identifying one or more actions performed by the user via one or more computing devices of the user, and
determining that the current location of the user is not a familiar location to the user;
assign the task to the user, the assigning being independent of any user interface input provided by the user to the one or more processors, wherein assigning the task to the user is based on determining that:
(i) the current location of the user is not familiar to the user,
(ii) the task is associated with individuals that are unfamiliar with a location of the entity that is indicated by the identified task, and
(iii) the location, of the entity, that is indicated by the task corresponds to the current location of the user;
identify a protocol that defines a plurality of parameters related to performance of the action for the entity;
initiate, based on assigning the task to the user and identifying the protocol, and without the user having ever provided any input related to the task to the one or more processors, a dialog with the user that is related to the task, wherein in initiating the dialog the one or more processors are to:
automatically provide, for audible presentation to the user via a speaker of a computing device of the user, content that is tailored to the task,
wherein prior to initiating the dialog, any ongoing dialog was not explicitly directed to the task, and
wherein the content that is tailored to the task is tailored to the entity of the task that is assigned to the user;
receive, in response to the providing, free-form natural language input that continues the dialog and that is formulated by the user via a user interface input device of the computing device;
generate additional content that is tailored to the task and that is based on the natural language input and that solicits input directed toward a group of the plurality of parameters of the protocol;
provide, in continuance of the dialog, the additional content for presentation to the user via a user interface output device;
receive, in response to providing the additional content, additional free-form natural language input that continues the dialog and that is formulated by the user via the user interface input device of the computing device;
determine that the free-form natural language input and the additional free-form natural language input include valid values for all parameters of the protocol for the task; and
initiate performance of the action for the entity with the valid values.

* * * * *